United States Patent [19]

McCloskey

[11] Patent Number: 4,894,897
[45] Date of Patent: Jan. 23, 1990

[54] LINEAR BEARING ASSEMBLY

[75] Inventor: Albert R. McCloskey, Fairfield, Conn.

[73] Assignee: Incom International, Inc., Pittsburgh, Pa.

[21] Appl. No.: 760,118

[22] Filed: Jul. 29, 1989

Related U.S. Application Data

[62] Division of Ser. No. 577,480, Feb. 6, 1984, Pat. No. 4,545,626.

[51] Int. Cl.⁴ ............................................. B21D 53/10
[52] U.S. Cl. ...................... 29/149.5 NM; 29/148.4 R; 29/149.5 R
[58] Field of Search ............... 29/149.5 R, 149.5 NM, 29/148.4 R, 148.4 C; 308/6 C

[56] References Cited

U.S. PATENT DOCUMENTS 4,311,348  1/1982  Olschowski et al. .......... 29/149.5 R
4,551,895 11/1985  Teramachi ..................... 29/148.4 R Primary Examiner—Joseph M. Gorski
Assistant Examiner—Irene Cuda
Attorney, Agent, or Firm—James Creighton Wray

[57] ABSTRACT

A linear bearing is made with races molded in place in a plastic shell. An inner ball cage is assembled by sliding the cage into the shell. Open ends of the ball receiving guides in the cage slide along the inward extending races. The cage and ball guide are completed with a cap fitted in an opposite end of the shell.

3 Claims, 3 Drawing Sheets

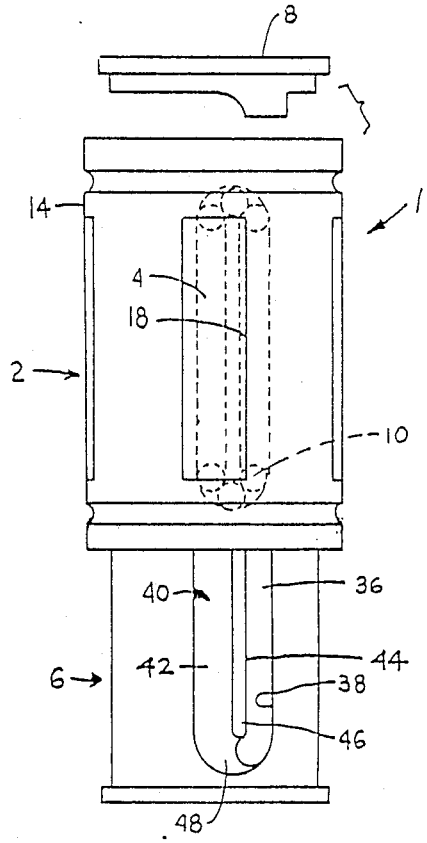
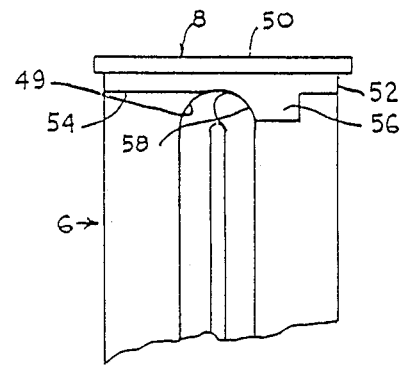
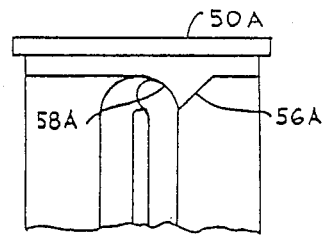
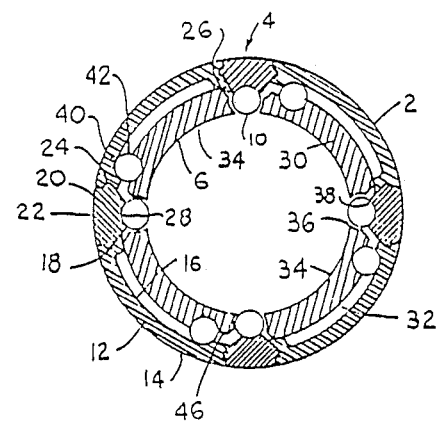
FIG. 1
FIG. 2
FIG. 2A
FIG. 3

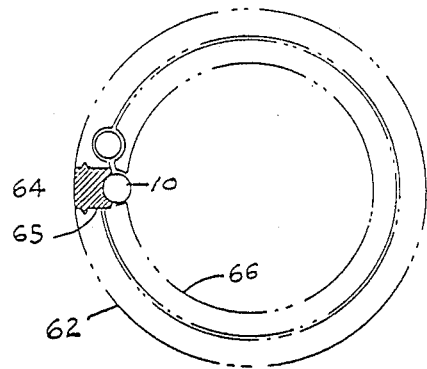
FIG. 5
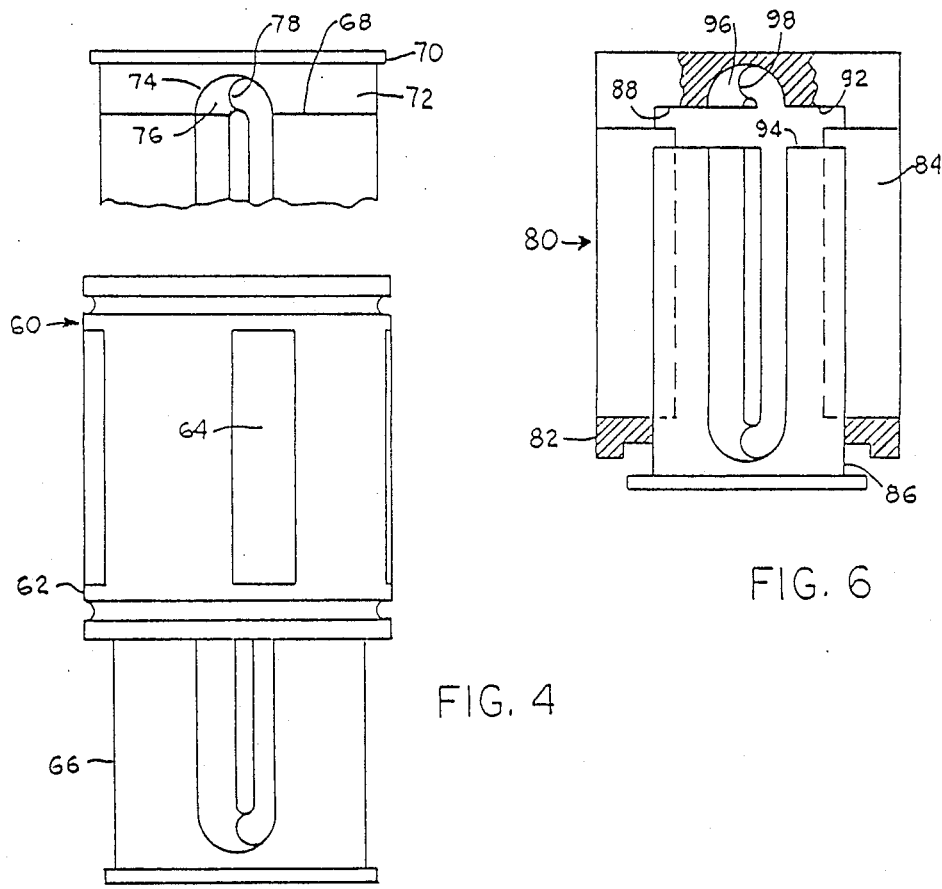
FIG. 6
FIG. 4

4,894,897

LINEAR BEARING ASSEMBLY

This application is a division of application Ser. No. 577,480, filed 2/6/84 now U.S. Pat. No. 4,545,626.

BACKGROUND OF THE INVENTION

The present invention relates to linear bearings and, particularly, to linear bearings having plastic shells, plastic cages and metal races.

Linear bearings with plastic shells and cages and metal tracks require step-by-step assembly of several individual parts which require complex machinery and motions and add time and expense to the assembly of the bearings. A need exists for a linear bearing which may be assembled from few separate parts and with fewer steps and less complex movements in the interests of reduced time and expense and increased economy.

BRIEF DESCRIPTION OF THE INVENTION

The present invention provides a linear bearing assembled in three parts with simple, axial motions. The unique bearing of the present invention can be constructed with a shell having molded-in-place ball tracks in which a cage and end cap are inserted from opposite ends. Time required to produce the bearing is minimal, and the bearing may be constructed with simple machinery using relatively simple, axial motions. The bearing has three basic parts which are easily and inexpensively handled and assembled.

The present invention provides a linear bearing with a shell with molded-in-place ball tracks and an inner ball cage which can be slid into the outer shell along the ball tracks while the ball tracks are in place and an end closure for the cage. The cage and end closure may be cemented in place within the shell or may be cemented to each other or may be welded in place with the shell or welded to each other or may be mechanically connected to each other by longitudinally engaged snap couplings or may mechanically be connected to the shell.

A preferred linear bearing includes a shell and linear races connected to the shell and extending transversely therefrom. The race has at one transverse extension thereof a track for receiving balls between the race and a device on which the bearing moves. A cage for mounting within the shell has a recirculating guideway for forming with the shell a path for recirculating balls. The cage is insertable axially in the shell. A cap mountable at one end of the shell has a guideway completing means. Preferably, the shell is constructed of molded material. The races are molded in place in the shell and are permanently embedded in the shell.

Preferably, the cage has alignment means cooperating with the shell and with the races for aligning ball exposing slots with the tracks in the races.

In preferred embodiments, the cage has an open end for guiding along races embedded in the shell and extending inward from the shell. The open end of the cage includes an axial opening in the guideway whereby the guideway slides along inward extended portions of the races. The cap closes the open end of the cage and closes the axial openings in the guideway and cooperates with the cage to complete the guideway.

In a preferred embodiment, the shell has first and second opposite axial end recesses. The cage has an end flange opposite an open end thereof for fitting in the first recess, and the cap has an end flange for fitting in the second recess.

The preferred end cap has a portion which fits axially inward into an open end of the cage to complete the end of the cage, and the axially inward extending portion of the cap contains a portion of the means for forming the slots which are aligned with the races.

Preferably, the guideway comprises a slot in the cage for alignment with the race and a groove in the cage parallel to the slot for directing balls along the groove in an unloaded condition. First and second rounded end portions guide balls from an active condition in the slot to an inactive condition in the groove and from an inactive condition in the groove to an active condition in the slot. The first rounded end portion is positioned in the cage near a closed end thereof.

The second rounded end portion has at least a portion thereof positioned in the cap.

Preferably, the second rounded end portion has a first portion connected to the slot mounted in the cap and has a second portion connected to the inactive guiding groove in the cage.

Preferred linear bearing apparatus has elongated metal races having active ball guiding grooves on inward surfaces thereof. The races are aligned parallel to each other and are spaced and disposed in a generally cylindrical arrangement. A molded plastic shell embeds the races therein and extends longitudinally beyond the races. Radial faces of the races extend from the shell; inner faces of the races extend inward beyond the shell.

In a preferred embodiment, a cage has a first axial end and a second axial end. The cage has a recirculating ball guide spaced axially inward from the first end and opening at the second end. The guide has an open slot extending through the cage for permitting portions of balls to extend inward through the cage in an active condition in which the balls contact a track of the race which is aligned with the slot. The guide further has a groove parallel to the slot for guiding balls in an inactive condition. A first semicircular end portion of the guide extends between the groove and the slot near the first end of the cage. The first semicircular end portion has a first groove portion connected to the groove and a first slot portion connected to the slot for guiding balls from a loaded condition in the slot to a nonloaded condition in the groove or vice versa, depending on direction of travel of the balls as controlled by direction of travel of the bearing on a support rod extending through the cage. The guide has a second end portion which opens axially at the second end of the cage for receiving the race. The cage may be assembled into the shell by sliding the cage axially inward in the shell. The opening at the second end of the guide allows passage of the cage over the race, which extends inward from the shell, for aligning the groove in the race with a slot of the guide in the cage.

A preferred cap has first and second axial ends. The second axial end has means for connecting the cap to the second axial end of the shell. The first axial end of the cap has means for engaging the second axial end of the cage when the cage is fully inserted within the shell. The first end of the cap has a curved guide for guiding balls between loaded to unloaded conditions within the shell and cage.

Preferably, the curved guide in the cap includes a curved slot for connecting in continuation of the open end of the slot in the cage.

In a preferred embodiment, the cage has at its second end a curved portion of the guide connected to the groove and being connectable to the curved and slotted portion of the cap for cooperating with the curved guide portion of the cap to guide balls between unloaded and loaded conditions in the slot and groove respectively.

Balls are inserted in the cages in conventional manners or by snapping balls into place through resilient edges of the slots in the cages, as described and claimed in a copending application filed on even date herewith.

These and other and further objects and features of the invention are apparent in the disclosure, which includes the above and ongoing specification with the appended claims and the drawings.

BRIEF DESCRIPTION OF THE DRAWINGS

FIG. 1 is a partially assembled view of a linear bearing showing the three parts used to complete the assembly.

FIG. 2 is a detail of a preferred connection between the cage and cap.

FIG. 2A is an alternate form of a connection between cage and cap.

FIG. 3 is a cross-sectional detail of an assembled linear bearing constructed according to the present invention.

FIG. 4 shows a modified, partially assembled form of the invention.

FIG. 5 shows a cross-sectional detail of a race, balls, guideway, cage and shell.

FIG. 6 shows a cross-sectional detail of an alternate form of the invention.

DETAILED DESCRIPTION OF THE DRAWINGS

Figure 8:
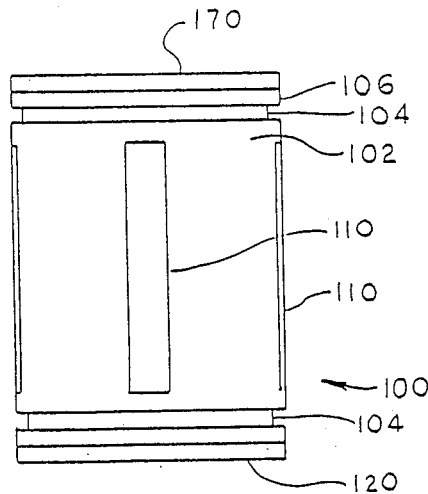
Figure 9:
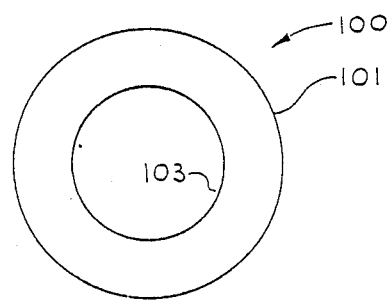

Referring to FIGS. 1 and 3, a bearing, generally indicated by the numeral 1, is made of three parts: a molded plastic shell 2 having races 4 permanently embedded therein, cage 6 which axially slides into the shell and cap 8 which completes the cage and is joined to the cage by bonding, welding or mechanical attachment. Balls 10 recirculate within guideways in the linear bearings as the bearings are moved along cylindrical supporting rods which extend through the centers of the bearings.

As shown in FIG. 3, shell 2 is constructed of a thin, molded plastic body 12 with an outer surface 14 and an inner surface 16. Equidistantly spaced, longitudinal openings 18 receive race ways 4 which are in the form of plural steel tracks 20 with outer surfaces 22 and circumferentially extending portions 24 which permanently anchor the tracks 20 in recesses 18 when the shell 2 is molded. Outer surfaces 22 of the tracks 20 may be flush or slightly raised from outer surface 14 of the shell 2. Inward extending portions 26 of the tracks 20 have grooves 28 along which loaded balls 10 travel as the bearing is moved in a linear direction.

Inner cage 6 has a plastic body 30 with an outer surface 32 and an inner surface 34. Balls 10 extend through a slot 36 in the body 30. Edges 38 of the slot engage inward extensions 26 of the tracks 20 to correctly align the slots 36 with the grooves 28 in the tracks.

A recirculating guide 40 includes the slots 36 and parallel grooves 42 through which the balls return in an unloaded condition to the slot 36. An inside wall 44 of dividing ridge 46 bears against the inward track extension 26.

When inserting the cage in the shell, the cage and shell may be relatively turned until surfaces 38 and 44 on cage 6 align with inward extended portion 26 of the track, such as by twisting the cage 6 slightly to the left, as shown in FIG. 1. The cage 6 and shell 2 are then assembled by pushing the cage upward within the shell. Thereafter, the cap 8 is pushed downward within the shell and to connect with cage 6.

As shown in FIG. 1, the guideway 40 has a first curved portion 48 to guide balls between groove 42 in which the balls are inactive and slot 36 in which the balls are active. As shown in FIG. 2, cap 8 has a flange 50 which fits within an upper recess in the linear bearing and a portion 52 which fits downward within the linear bearing. A shelf-like portion 54 overlies and is joined to an abutting portion of the cage. Portion 56 of the cap extends into an opening in the upper end of the cap to support curved portion 58 which completes a curved transition portion of the slot. The curved portion 58 cooperates with the curved portion 49 of the groove in the cage 6 to provide the semicircular redirection portion of the guideway 40.

As shown in FIG. 2A, the inward extending portion 56A of the cap is tapered to aid alignment during insertion of the cap in the shell.

An alternate embodiment, generally referred to by the numeral 60 in FIG. 4, has a shell 62, races 64 and a cage 66. An upper open end of the cage 68 is substantially planar. Cap 70 has a portion 72 which extends into the shell 62, nd the inward extending portion includes a semicircular transition portion 74 of the guideway which includes a curved portion 76 of the groove and a curved portion 78 of the slot.

As shown in FIG. 5, the cage 62 is aligned on surfaces 65 of the track. Balls 10 circulate along the guideway formed in the cage and completed by the inner surface of the shell.

A modification 80 of the invention shown in FIG. 6 has a shell 82 with permanently embedded races 84 and a cage 86 which slides into the shell along the races 84. A cap 88 is formed as a permanently connected portion of the shell 82. An inner surface 92 of the end cap 88 abuts and connects to the end surface 94 of cage 86. Curved groove portions 96 and slot portions 98 are formed in the end cap 88.

While the invention has been described with reference to specific embodiments, modifications and variations of the invention may be constructed without departing from the scope of the invention. The scope of the invention is defined in the following claims.

I claim:

1. The method of assembling linear bearings comprising molding and permanently embedding races in a moldable plastic shell, sliding a cage axially into the shell with an open end of a ball guide sliding along an inward extended portion of a race and closing the open end of the ball guide by inserting a single cap having a curved ball guide portion axially into the shell, whereby the ball guide portion of the cap completes the ball guide of the cage.

2. The method of claim 1 wherein the closing comprises inserting the cap in a second longitudinal end of the shell and extending portions of the cap inward therein to complete a recirculating ball guide in the cage.

3. The method of assembling linear bearings comprising, forming first portions of ball guides in an outer surface of a moldable plastic cage,
permanently embedding races in a moldable plastic shell,
sliding the cage axially into one end of the shell with an open end of the first portions of the ball guides sliding along an inward extended portion of a race, and
closing the open end of the ball guides with a cap having a curved ball guide portion by inserting the cap into the opposite end of the shell, thereby completing the ball guides.

* * * * *